United States Patent [19]

Lesnock

[11] Patent Number: 5,175,953
[45] Date of Patent: Jan. 5, 1993

[54] FISHING ROD WITH EYELET DE-ICING

[76] Inventor: Richard J. Lesnock, 149 Biltmore, Dearborn Heights, Mich. 48127

[21] Appl. No.: 691,522

[22] Filed: Apr. 25, 1991

[51] Int. Cl.$^5$ ............................................. A01K 87/04
[52] U.S. Cl. ........................................................ 43/24
[58] Field of Search .................... 43/17.1, 18.1, 24, 25; 219/200, 201

[56]  References Cited

U.S. PATENT DOCUMENTS

| 3,164,921 | 1/1965 | Mavrakis | 43/24 |
| 3,613,682 | 10/1971 | Naylor . | |
| 3,624,346 | 11/1971 | Guth | 219/201 |
| 3,973,422 | 8/1976 | Cervera . | |
| 3,981,095 | 9/1976 | Shepherd . | |
| 4,043,070 | 8/1977 | Lamothe . | |
| 4,646,461 | 3/1987 | McLeod | 43/23 |
| 4,697,375 | 11/1987 | Mills . | |
| 4,742,755 | 5/1988 | Peterson . | |

FOREIGN PATENT DOCUMENTS 2175781 12/1986 United Kingdom ................. 43/18.1

Primary Examiner—Richard K. Seidel
Assistant Examiner—James Miner
Attorney, Agent, or Firm—Peter D. Keefe

[57]  ABSTRACT

A fishing rod having provision for elimination of eyelet guide icing. The fishing rod is composed of an elongate fishing pole member, a handle member connected with the fishing pole member, a plurality of eyelets connected with the fishing pole member, a heating element associated with at least one of the eyelet guides, particularly the tip eyelet guide, and an electrical power source located within the handle member for selectably actuating the heating element.

4 Claims, 1 Drawing Sheet

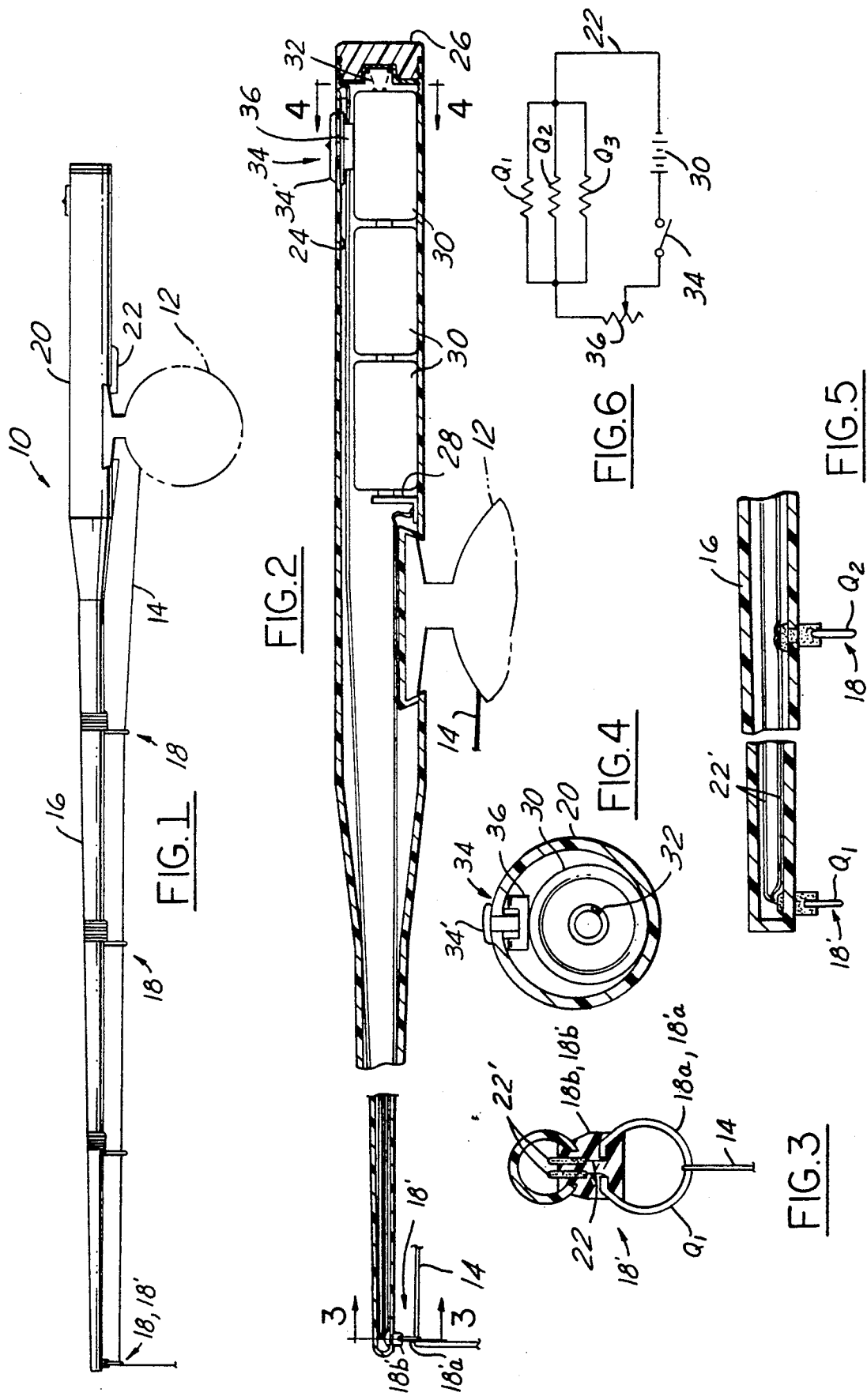

FISHING ROD WITH EYELET DE-ICING

BACKGROUND OF THE INVENTION

1. Field of the Invention

The present invention relates to fishing rods, and more particularly to a fishing rod having eyelets which are selectively heated so as to provide relief from ice build-up therewithin.

2. Description of the Prior Art

Fishing rods are constructed of an elongate, usually flexible, pole member, a reel connected with the pole member, and a plurality of eyelets connected with the pole and spaced therealong so as to guide line from the reel to the end of the pole member. The eyelets are constructed of guides of generally annular shape that are connected with stand-offs, the stand-offs being connected with the pole member. When fishing, the eyelet guides can easily pick-up water from precipitation, from contact with the body of water being fished or from the line during reeling-in. This water contacting the eyelet guides is no problem in warm weather, but can be a source of major objection in cold weather. In cold weather, this water can freeze quite easily and thereby cause the eyelet guides to become obstructed. In severe conditions of freezing, the ice in the eyelet guides can actually lock the line in a fixed position in the eyelet guide. In the very least, any icing in the eyelet guides impedes free action of the line—a most important property to the enjoyment of fishing.

U.S. Pat. No. 4,043,070 to Lamothe, dated Aug. 23, 1977, discloses a fishing rod for ice fishing. Lamothe discloses a fishing pole member that is hollow, through which the line is threaded and exits at a tip in the pole member. Lamothe reasons that the dangers of the line becoming immobilized due to icing is minimized if the line is kept within the rod hollow. However, Lamothe's ice fishing rod will still be at atmospheric temperature, and as line is taken-in, water will enter the rod hollow and then freeze in cold weather. Thus, while Lamothe may reduce the problem somewhat, he does not effectively solve the problem of ice caused immobilization of the line. Further, Lamothe proposes a radical restructuring of the conventional fishing rod, which would be most unlikely to find acceptance among sportsmen.

Accordingly, what is needed in the art is a fishing rod of conventional configuration which provides for the elimination of ice at the eyelet guides.

SUMMARY OF THE INVENTION

The present invention is a fishing rod of conventional configuration having provision for elimination of eyelet guide icing.

The fishing rod according to the present invention is composed of a fishing pole member, a handle member connected with the fishing pole member, a plurality of eyelets connected with the fishing pole member, a heating element associated with at least one of the eyelet guides, particularly the tip eyelet guide, and an electrical power source located within the handle member for selectably actuating the heating element.

Accordingly, it is an object of the present invention to provide a fishing pole which includes de-icing of at least one of the eyelet guides to thereby allow free movement of the line even in sub-freezing weather.

These, and additional objects, advantages, features and benefits of the present invention will become apparent from the following specification.

BRIEF DESCRIPTION OF THE DRAWINGS

FIG. 1 is a side view of the fishing rod according to the present invention.

FIG. 2 is a fragmentary, partly sectional side view of the fishing rod according to the present invention.

FIG. 3 is a partly sectional end view of the fishing rod according to the present invention, seen along lines 3—3 in FIG. 2.

FIG. 4 is a partly sectional end view of the fishing rod according to the present invention, seen along lines 4—4 in FIG. 2.

FIG. 5 is a fragmentary, partly sectional side view of the fishing rod according to the present invention, detailing the electrical wiring at the tip eyelet and an adjacent eyelet thereof.

FIG. 6 is a schematic diagram of an electrical circuit for carrying-out the present invention, by way of example depicting the electrical circuit for a fishing rod having three eyelet guides equipped with heating elements.

DETAILED DESCRIPTION OF THE PREFERRED EMBODIMENT

Referring now to the drawings, FIG. 1 shows the fishing pole 10 according to the present invention in operation with a reel 12 and line 14. The fishing rod 10 is composed of a fishing pole member 16, a plurality of eyelets 18 spaced along the fishing pole member, and a handle member 20 located at one end of the fishing pole member, having generally associated therewith attachment structure 22 for removably connecting the reel 12 to the fishing rod 10. Line 14 extends from the reel 12, threads through successive eyelets, then is freed from the fishing rod 10 at tip eyelet 18'. As can be understood by simultaneous reference to FIGS. 2 and 3, the eyelets 18 are composed of a guide 18a which has the shape of an annulus, and a stand-off 18b which connects the eyelet guide 18a to the fishing pole member 16.

It is conventional practice for the cross-section of the eyelet guides to progressively decrease with distance from the reel, being of smallest cross-section at the tip eyelet 18'. The tip eyelet 18' is most subject to icing for several reasons: 1) its relatively smaller cross-section is most sensitive to ice build-up of all the eyelet guides, 2) its great likelihood of being occasionally immersed during fishing, and 3) its primary exposure to water clinging to the line as the line is reeled-in. Thus, while any and all of the eyelet guides may be provided with a heating element that prevents or removes unwanted ice, it is most essential for the tip eyelet guide to be provided with the heating element. Accordingly, while the preferred embodiment of the present invention depicts a heating element $Q_1$ for the tip eyelet guide, as this is preferred for the sake of economy and need, it is to be understood that similarly installed elements $Q_2$, $Q_3$, etc. can be located in any other eyelet guides, as depicted in FIGS. 5 and 6.

The structure and function of the fishing rod 10 according to the present invention will now be particularly described with reference now being directed to FIGS. 2 through 5.

The fishing pole member 16 is preferred to be of a known composition, such as graphite, fiberglass, or other common fishing rod material, and to be configured as an elongated rod. Within the fishing pole member 16, and extending therealong, are a pair of mutually insulated wires 22. The eyelets 18 are connected to the fishing pole 16, via the stand-offs 18b, in a conventional manner.

The tip eyelet 18' has a stand-off 18b' structured for receiving therethrough the two wires 22. The eyelet guide 18a' of the tip eyelet 18' is constructed of a metallic material which acts as a heating element $Q_1$ when exposed to electrical current on the order of 1.5 to 12 volts. The wires 22 are electrically connected to the eyelet guide 18a'. In the event it is preferred to construct the fishing pole member 16 with a hollow space for accommodating the wires 22, then it is preferred that the wires be each covered with an insulator 22'. Alternatively, the wires may be embedded in the solid construction of the fishing rod 16, there being no hollow within the fishing pole member.

The handle member 20 is connected with the fishing pole member 16 in a conventional manner. The handle member contains a cavity 24, the cavity being accessed by a threaded end cap 26. Within the cavity 24 is a first battery contact 28 for electrically contacting one polarity end of least one conventional electrical battery 30 (FIG. 2 shows three batteries). One of the wires 22 is connected to the first battery contact 28. The other wire of wires 22 is connected with a second electrical contact 32 located on the end cap 26. One of the wires, the one connecting to the end cap being preferred, is connected with a switch 34. The switch serves to selectively complete an electrical circuit from the batteries 30 through the wires 22 to the heating element $Q_1$ of eyelet guide 18a' of the tip eyelet 18', thereby causing the eyelet guide 18a' to heat. Any suitable conventional switch may be used for the switch 34, with a portion thereof 34' providing user control thereof. It is possible that in lieu of, or as an adjunct thereto, the user operated switch 34 that a timed thermal sensor switch can be used to automatically regulate periodic electrical power delivery to the heating element eyelet guide 18a' during fishing.

If desired, an optional rheostat 36 can be connected with the user operated portion 34' of the switch. In this event, a selected amount of electrical energy can be delivered to the eyelet guide 18a'. At one setting, a small amount of electrical power may be kept on at all times during fishing to prevent ice from ever building-up. At a higher setting, a large amount of electrical power can be delivered to the eyelet guide 18a' in order to melt an accumulation of ice quickly.

In operation, the user would place fresh batteries into the battery cradle, then proceed to fish. In the event the weather is sufficiently cold that ice develops on the eyelet guide of the tip eyelet, the user closes the switch to deliver electrical power to the heating element of the eyelet guide of the tip eyelet. Ice will thereupon melt away. Power can continue to be supplied, as the power drain on the batteries should be so minimal as to permit operation for a number of hours of enjoyable fishing. If the fishing rod is equipped with a rheostat, the user may adjust electrical power to the eyelet guide to an optimum based upon prevailing environmental conditions.

To those skilled in the art to which this invention appertains, the above described preferred embodiment may be subject to change or modification. For instance, it is to be understood that electrical power can be supplied from an external source, rather than from a source located within the fishing rod. Such change or modification can be carried out without departing from the scope of the invention, which is intended to be limited only by the scope of the appended claims.

What is claimed is:

1. A fishing rod, said fishing rod guiding line used for fishing, said fishing rod comprising:
   a fishing pole member, said fishing pole member having a first end and a second end;
   a plurality of eyelets connected with said fishing pole member, each eyelet of said plurality of eyelets being spaced along said fishing pole member at predetermined locations, each eyelet having an eyelet guide for guiding the line, one eyelet being a tip eyelet located at said first end of said fishing pole member;
   electrical heating element means connected with the eyelet guide of said tip eyelet for supplying heat to said eyelet guide for melting ice accumulated on said eyelet guide;
   a handle member connected with said second end of said fishing pole member;
   electrical power means connected with said fishing pole member for supplying electrical power to said electrical heating element means; and
   rheostat means connected with said electrical power means for providing selection of an amount of electrical power delivered from said electrical power means to said electrical heating element means.

2. The fishing rod of claim 1, wherein said handle member has a cavity therewithin, further wherein said electrical power means comprises:
   first battery connection means located in said cavity of said handle member for connecting with a first polarity of at least one battery received within said cavity;
   a threaded cap which threadably connects with said handle member to provide access to said cavity of said handle member for said at least one battery to be placed thereinto, said threaded cap having a second battery connection means for connecting with a second polarity of said at least one battery;
   wires extending through said fishing pole member and eletrically connected to each of said electrical heating element means and said first and second connection means, thereby collectively forming an electrical circuit; and
   switch means connected with said wires for selectively completing the electrical circuit.

3. A fishing rod, said fishing rod guiding line used for fishing, said fishing rod comprising:
   a fishing pole member, said fishing pole member having a first end and a second end;
   a plurality of eyelets connected with said fishing pole member, each eyelet of said plurality of eyelets being spaced along said fishing pole member at predetermined locations, each eyelet having an eyelet guide for guiding the line, one eyelet being a tip eyelet located at said first end of said fishing pole member;
   electrical heating element means connected with at least two eyelet guides of said plurality of eyelets for supplying heat to said at least two eyelet guides for melting ice accumulated on said at least two eyelet guides;
   a handle member connected with said second end of said fishing pole member;

electrical power means connected with said fishing pole member for supplying electrical power to said electrical heating element means; and rheostat means connected with said electrical power means for providing selection of an amount of electrical power delivered from said electrical power means to said electrical heating element means.

4. The fishing rod of claim 3, wherein said handle member has a cavity therewithin, further wherein said electrical power means comprises:

first battery connection means located in said cavity of said handle member for connecting with a first polarity of at least one battery received within said cavity;

a threaded cap which threadably connects with said handle member to provide access to said cavity of said handle member for said at least one battery to be placed thereinto, said threaded cap having a second battery connection means for connecting with a second polarity of said at least one battery;

wires extending through said fishing pole member and electrically connected to each of said electrical heating element means and said first and second connection means, thereby collectively forming an electrical circuit; and switch means connected with said wires for selectively completing the electrical circuit.

* * * * *